United States Patent [19]

Babin et al.

[11] Patent Number: 5,742,159
[45] Date of Patent: Apr. 21, 1998

[54] ANGULAR VELOCITY SENSOR WITH HOUSING AND BOBBIN FORMING WEDGE FIT SEAL

[75] Inventors: Brian G. Babin, Clinton Township, Mich.; Daniel D. Jarodsky, St. Charles, Ill.

[73] Assignee: SSI Technologies, Inc., Janesville, Wis.

[21] Appl. No.: 712,793

[22] Filed: Sep. 12, 1996

Related U.S. Application Data

[62] Division of Ser. No. 363,900, Dec. 27, 1994, Pat. No. 5,629,618.

[51] Int. Cl.⁶ .............. G01P 1/02; G01P 3/488; H01F 27/02
[52] U.S. Cl. .............. 324/173; 29/595; 174/52.3; 324/174; 336/92
[58] Field of Search .................. 324/173, 174, 324/207.15, 207.16, 207.25, 207.26, 258; 73/660, 661, 488, 493, 514.39; 336/90, 92, 96; 310/168; 174/52.1, 52.3; 29/595, 602.1, 606, 607; 335/278

[56] References Cited

U.S. PATENT DOCUMENTS

| | | | |
|---|---|---|---|
| 3,252,024 | 5/1966 | Loudon | 310/155 |
| 4,510,408 | 4/1985 | Jovick et al. | 324/173 X |
| 4,652,818 | 3/1987 | Buchschmid et al. | 324/174 |
| 4,829,245 | 5/1989 | Echasseriau et al. | 324/174 |
| 5,032,790 | 7/1991 | Johnson | 324/174 |
| 5,121,056 | 6/1992 | Onishi et al. | 324/207.15 |
| 5,138,293 | 8/1992 | Ishimaru . | |
| 5,229,715 | 7/1993 | Niino et al. | 324/207.15 |
| 5,278,496 | 1/1994 | Dickmeyer et al. | 324/174 |
| 5,375,293 | 12/1994 | Gilbertson . | |
| 5,381,089 | 1/1995 | Dickmeyer et al. | 324/174 |
| 5,426,844 | 6/1995 | Suda et al. | 29/606 |
| 5,499,934 | 3/1996 | Jacobsen et al. . | |
| 5,589,664 | 12/1996 | Rode | 324/207.2 X |

FOREIGN PATENT DOCUMENTS

| | | | |
|---|---|---|---|
| 4134279 | 4/1993 | Germany | 324/174 |
| 339261 | 11/1992 | Japan | 324/174 |

*Primary Examiner*—Gerard R. Strecker
*Attorney, Agent, or Firm*—Michael, Best & Friedrich LLP

[57] ABSTRACT

A sensor for detecting the angular velocity of a rotating member. The sensor includes a bobbin having an exterior defining an annular recess and a coil within the recess. The bobbin also has a generally cylindrical aperture and supports a probe and a permanent magnet in the aperture. The housing is secured to the bobbin and the housing and bobbin include tapered inner and outer surfaces, respectively, that are made to form a wedge fit seal between the bobbin and the housing to prevent the introduction of molding material during the overmolding process. The bobbin also includes supports for supporting the lead wires extending between the coil and the terminals.

17 Claims, 3 Drawing Sheets

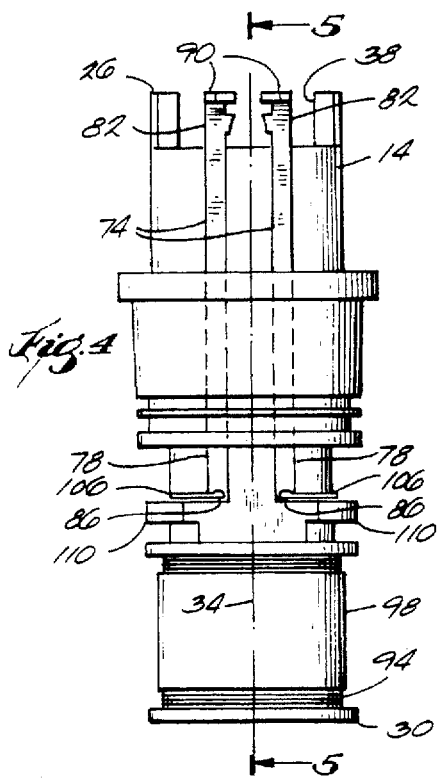
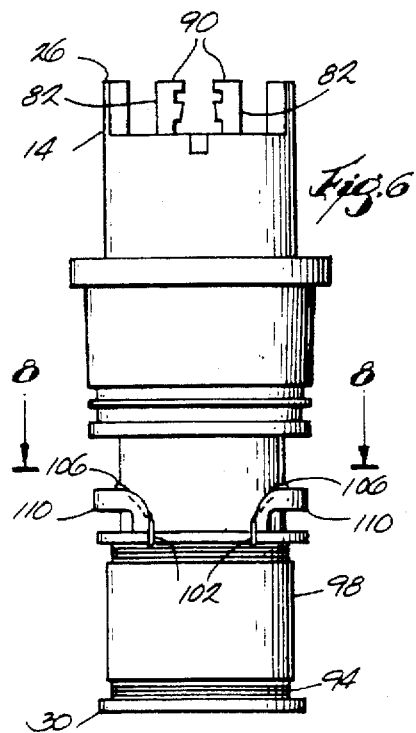
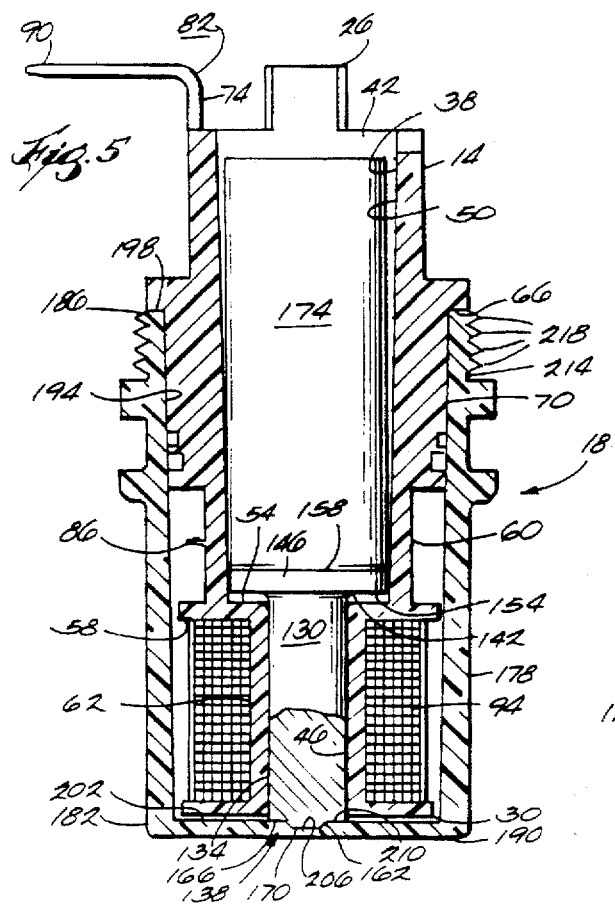
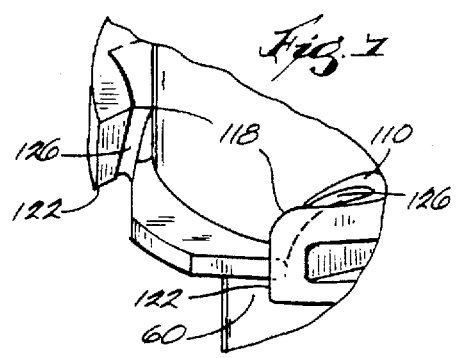
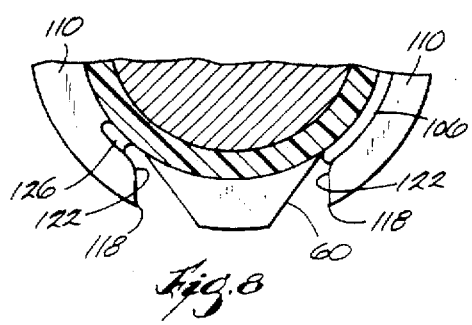

ANGULAR VELOCITY SENSOR WITH HOUSING AND BOBBIN FORMING WEDGE FIT SEAL

This is a divisional of application Ser. No. 08/363,900, filed Dec. 27, 1994, now U.S. Pat. No. 5,629,618 entitled "IMPROVED HOUSING FOR A WHEEL SPEED SENSOR" and issued May 13, 1997.

BACKGROUND OF THE INVENTION

The invention relates to a sensor for detecting the angular velocity of a rotating element and particularly to an improved housing for a variable reluctance speed sensor.

It is known in the art to mount a speed sensor in the transmission or in the bearing or wheel end assembly of a vehicle such as a truck or an automobile. Typically, the sensor includes a coil mounted on a bobbin which is inserted into a housing. The sensor measures the angular velocity of rotating elements within the transmission or bearing assembly. However, the environments in which the sensors are employed can be extremely harsh and the sensors must be capable of withstanding a significant amount of repeated temperature variations over a wide range of temperatures (thermal cycling), intense vibration and exposure to corrosive elements. In order to seal the sensor from the environment the bobbin is connected to the housing and the combination is overmolded to provide a molded seal between the bobbin and the housing.

SUMMARY OF THE INVENTION

One problem with known sensors is that if the bobbin and the housing do not form a mechanical seal between one another, the molding material may flow into the housing and damage the coil.

Another problem with known sensors is that if the lead wires of the coil are not adequately secured to the bobbin, the intense vibration of the vehicle may cause mechanical fatigue of the leads resulting in degradation or complete failure of the sensor. Alternatively, if the coil and lead wires are too securely fixed to some structure on the sensor, or if the portion of the bobbin holding the coil engages the housing, the constant thermal cycling may place mechanical stresses on the coil and lead wires and eventually cause either the coil or the lead wires to break.

Another problem has been that of positioning the probe close enough to the rotating element so that the signal generated by the sensor is strong. The closer the probe is to the rotating element, the better or stronger the signal generated by the coil.

Therefore, it is desirable to provide a speed sensor having a housing that provides a sealed environment for the bobbin and coil and is capable of withstanding exposure to thermal cycling, vibration and corrosive elements without damage to the sensor and that generates a signal sufficient to measure the speed of the rotating element.

Accordingly, the invention provides a sensor including means for supporting the skeined (i.e., braided for increased strength) lead wires securely against the exterior of the bobbin to prevent excess vibration of and stress on the lead wires, a tapered or wedge fit lock between the bobbin and the housing to prevent molding material from flowing into the housing during the overmolding process, a top hat or shoulder on the bobbin to act as a material shield which redirects material flow during the over-mold process, and to position and support the coil in the housing and prevent contact between the coil and the housing, and an improved housing/probe interface to position the probe near the rotating element without weakening the housing.

More specifically, the bobbin has an interior surface defining a generally cylindrical aperture and an exterior surface. The exterior surface defines an annular recess, an upper portion having a tapered outer surface and an annular shoulder.

A coil is mounted on the bobbin and within the recess. The coil includes a pair of skeined lead wires that are soldered to the ends of respective terminals, supported by the bobbin. Each lead wire includes a portion extending between the recess and the respective terminal. The bobbin includes supporting means mounted on the exterior surface of the bobbin. The supporting means includes a pair of supporting shelves each having an end and a tapered tang or extension projecting from the end. The tang is spaced from the exterior surface of the bobbin and a ramped chute is between the exterior surface and the bobbin. The lead wires extend from the coil and through the ramped chute to the respective shelves. Each shelf supports the portion of the lead wire extending between the recess and the terminal. The tang and the shelf secure and position that portion of the respective lead wire against the bobbin to prevent separation of that portion during thermal cycling or vibration of the sensor.

The sensor also includes a generally cylindrical housing constructed and arranged to receive at least a portion of the bobbin so as to enclose the coil within the housing. The housing includes an end wall having an inner surface. In one embodiment, the inner surface includes a recess formed therein and an engaging surface surrounding the recess. The housing also includes a generally cylindrical sidewall connected to the end wall. The generally cylindrical sidewall has a tapered inner surface and an annular rim opposite the end wall. The tapered inner surface of the housing engages the tapered outer surface of the bobbin to provide a wedge fit seal or lock between the bobbin and the housing. The seal prevents the introduction of molding material into the housing during the overmolding process. The bobbin is completely inserted within the housing when the annular rim on the housing engages the annular shoulder on the bobbin. The annular shoulder provides a positive stop against over insertion of the bobbin into the housing, and positions and supports the bobbin within the housing so that no portion of the bobbin other than the outer tapered surface of the bobbin, engages the inner surface of the housing. The precise positioning of the bobbin within the housing prevents contact between the housing and the portion of the bobbin defining the annular recess. Such contact could result in stress during thermal cycling or vibration of the sensor and this stress could in turn result in damage to the coil mounted on the bobbin.

A pole piece or probe of ferromagnetic material is mounted within the cylindrical aperture in the bobbin. The probe has a generally circular end surface and the end surface includes a centrally positioned raised portion and periphery surrounding the raised portion. In one embodiment, the periphery engages the engaging surface of the end wall of the housing so that the raised portion of the probe end surface extends into the recess in the end wall of the housing.

A principal feature of the invention is the provision of a sensor having a bobbin and housing for providing a seal with the bobbin to prevent the introduction of contaminants and molding materials into the housing during the overmolding process.

Another feature of the invention is the provision of a sensor having a bobbin and a housing therefor, the bobbin and housing interacting to completely suspend the coil and that portion of the bobbin supporting the coil within the housing, thereby preventing transmission of stress to the coil during thermal cycling of the apparatus.

Another feature of the invention is the provision of a sensor having a bobbin for supporting the skeined leads of a coil.

Another feature of the invention is the provision of a sensor having a probe that engages the end wall of the housing to position the probe sufficiently close to the rotating element to measure the angular velocity of the rotating element.

Other features and advantages of the invention will become apparent to those skilled in the art upon review of the following detailed description, claims, and drawings.

DESCRIPTION OF THE DRAWINGS

FIG. 4 is a front elevational view of the bobbin of the sensor.

FIG. 5 is a view taken along line 5—5 in FIG. 4, but differs from FIG. 4 in that FIG. 5 shows the housing mounted on the bobbin.

FIG. 6 is a rear elevational view of the bobbin.

FIG. 7 is an enlarged partial view of the bobbin showing the supports for the skeined leads of the coil.

FIG. 8 is a partial cross section taken along line 8—8 in FIG. 6.

Figure 1:
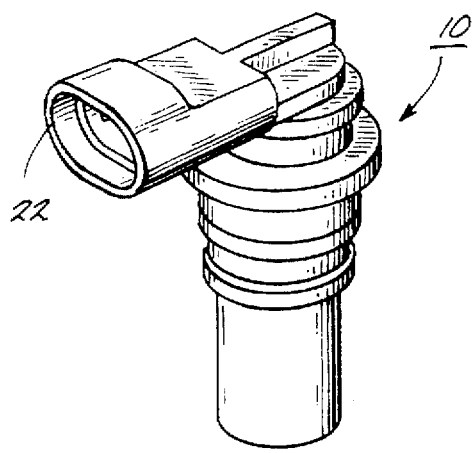
FIG. 1 is a perspective view of an overmolded speed sensor.

Before one embodiment of the invention is explained in detail, it is to be understood that the invention is not limited in its application to the details of construction and the arrangements of components set forth in the following description or illustrated in the drawings. The invention is capable of other embodiments and is capable of being practiced or of being carried out in various ways. Also, it is to be understood that the phraseology and terminology used herein is for the purpose of description and should not be regarded as limiting.

DESCRIPTION OF THE PREFERRED EMBODIMENT

Figure 2:
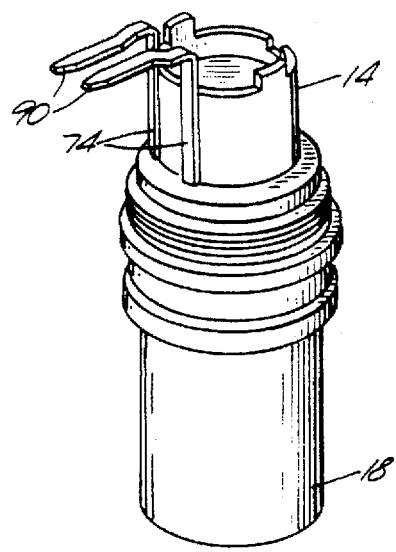
FIG. 2 is a perspective view of the sensor before the sensor has been overmolded and showing the housing with the bobbin inserted in the housing.
Figure 3:
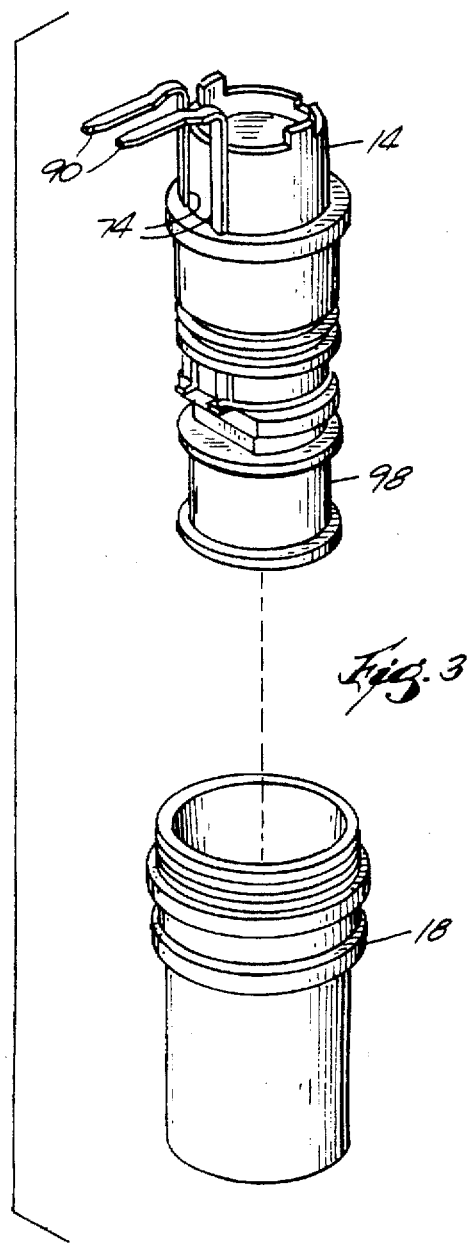
FIG. 3 is an exploded perspective view of the sensor showing the bobbin and the housing.

Shown in FIG. 1 of the drawings is a sensor 10 for detecting the angular velocity of a rotating member (not shown) such as the rotating bearing element of a bearing assembly in a vehicle wheel or a rotating element in the transmission of a vehicle such as an automobile or truck. As best shown in FIGS. 2 and 3 of the drawings, the sensor 10 includes a bobbin or bobbin assembly 14 that fits within a housing 18. While the housing shown in the drawings is generally cylindrical (i.e., circular in cross-section), it should be understood that housings having different cross-sectional configurations (e.g., oval, rectangular, pentagonal, hexagonal, etc.) are appropriate. The combination of the housing 18 and bobbin 14 is overmolded to form the finished product (shown in FIG. 1) and completely seal the bobbin 14 within the housing 18. The process of overmolding creates a connector or fitting 22 (FIG. 1) allowing the sensor 10 to be connected to an input connector (not shown) for conducting the electrical signals generated by the sensor 10 to signal conditioning circuitry (also not shown).

The bobbin 14 is a generally cylindrical injection molded plastic shell. Referring specifically to FIGS. 4, 5, and 6, the bobbin 14 has opposite ends 26 and 30 and a longitudinal axis 34 (FIG. 4) extending between the ends 26 and 30. The bobbin 14 has an interior surface 38 (FIG. 5) defining a cylindrical aperture 42 extending between the ends 26 and 30 and along the axis 34. As best seen in FIG. 5, the interior surface 38 has first and second portions 46 and 50 and an annular shoulder or stepped portion 54 between the first and second portions 46 and 50 such that the first portion 46 of aperture 42 is narrower in diameter than the second portion 50 of aperture 42.

Still referring to FIG. 5, the bobbin 14 also includes an exterior surface 60 which defines an end portion or support 58 having an annular recess 62, an annular shoulder 66 and a tapered outer surface 70 between the end portion 58 and the annular shoulder 66.

Shown in FIGS. 4–5, a pair of electrically conductive leads 74 are molded into the bobbin 14. Each lead 74 includes opposite ends 78 (FIG. 4 only) and 82. One of the ends 78 defines a terminal 86 positioned between the recess 62 and the tapered surface 70 of the bobbin exterior surface 60. The other of the ends 82 extends beyond the annular shoulder 66 and defines a male connecting pin 90. The male connecting pin 90 provides an electrical connection between the sensor 10 and the signal conditioning circuitry (not shown).

An induction coil 94 is mounted in the annular recess 62 of the bobbin 14. The coil 94 is an electrical conductor such as copper wire that is wound around bobbin 14 and within the annular recess 62. The electrical properties of the coil 94 may vary depending upon the number of turns of the electrical conductor and the thickness or gauge of the conductor. These variables are dictated by the particular application in which the sensor 10 is being used. A piece of electrically insulating tape 98 (FIG. 4) is wound around the coil 94 to secure the coil 94 in place in the recess 62.

As shown in FIG. 6, the coil 94 terminates with a pair of electrically conductive lead wires 102. The lead wires 102 include portions 106 (FIGS. 6 and 8) that extend in opposite directions around the exterior of the bobbin 14, between the annular recess 62 and the respective terminals 86. As best shown in FIGS. 6, 7, and 8, the exterior of the bobbin 14 includes a support 110 for each lead wire portion 106. The supports 110 are mirror images of one another (FIG. 8). The supports 110 each terminate at an end portion 118 adjacent the rear (FIG. 6) of the bobbin 14. The end portions 118 of the supports 110 each define oppositely facing tangs 122 spaced from the exterior surface 60 and between the recess 62 and the shoulder 66 so as to form tapered or ramped chutes 126 (only one of which is shown in FIG. 8) sloping from the annular recess 62 in the bobbin 14 to the respective supports 110. The lead wires 102, which in the preferred embodiment are skeined (i.e., braided for increased strength), extend from annular recess 62, around the respective tangs 122, through chutes 126, to supports 110 and radially around the exterior surface 60 of bobbin 14 to the respective terminals 86. The lead wires 102 are held in place in the respective chutes 126 by tangs 122 and are soldered to the respective terminals 86 in order to make a secure electrical connection between the lead wires 102 of the coil 94 and the electrically conductive leads 74 molded into the bobbin 14. Supporting the lead wires 102 between the tangs 122 and the exterior surface 60 of bobbin 14 secures the lead wires 102 against the exterior surface 60 of the bobbin 14 and prevents them from separating from the exterior surface 60 of the bobbin 14 in response to vibration of the vehicle or stress resulting from thermal cycling of the sensor 10 and reduces the risk of damage due to mechanical fatigue of the lead wires 102.

Figure 9:
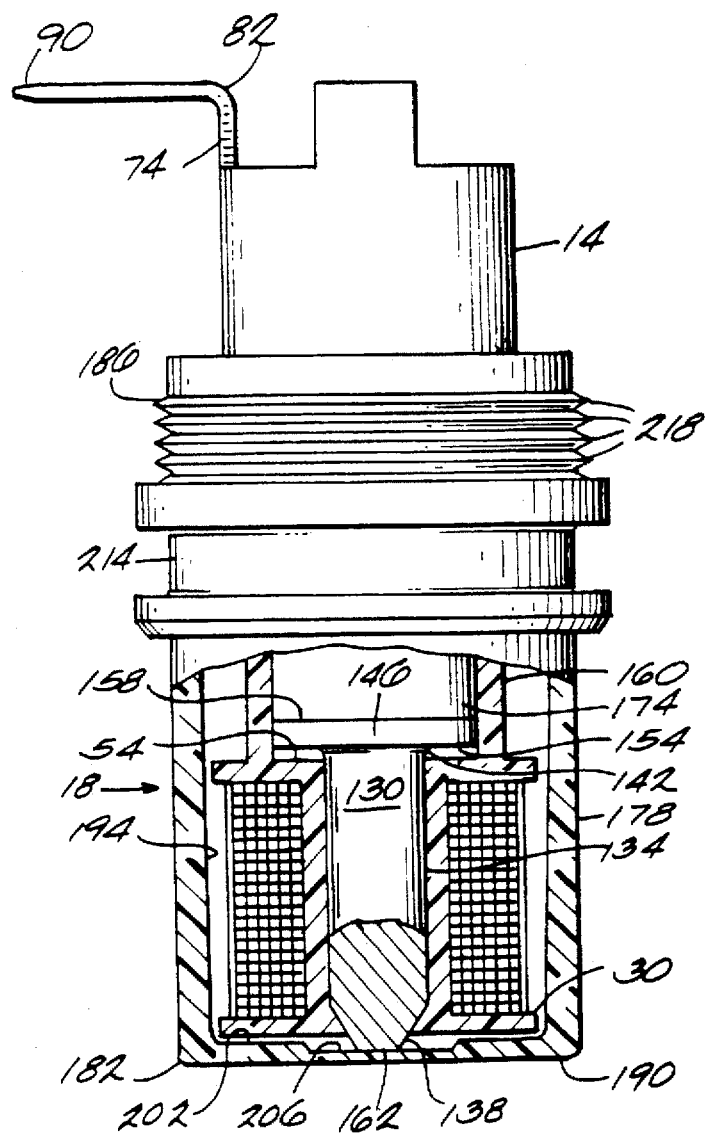
FIG. 9 is a partial, sectional view of a speed sensor that is another embodiment of the invention.

Referring now to FIG. 9, the sensor 10 also includes a probe 130 made of ferromagnetic material. The probe 130 is mounted within the cylindrical aperture 42 in the bobbin 14. The probe 130 includes a cylindrical portion 134 having a first end portion 138 and a second end portion 142. The first end portion 138 of the cylindrical portion 134 of the probe 130 includes an end surface 162. A base portion 146 is connected to the second end portion 142. The base portion 146 has a diameter larger than the diameter of the first portion 46 of the interior surface 38 defining cylindrical aperture 42 in the bobbin 14 and the base portion 146 includes first and second opposite side surfaces 154 and 158, respectively. The first side surface 154 faces the stepped portion 54 of the interior surface 38.

A permanent magnet 174 is also mounted within the cylindrical aperture 42 of the bobbin 14. The magnet 174 engages the base portion 146 of the probe 130 to provide a permanent source of magnetic flux. The contact between the probe 130 and the magnet 174 provides a low reluctance flux path for the magnetic field generated by the magnet 174.

Still referring to FIG. 9, the housing 18 of sensor 10 has a cylindrical sidewall 178 having opposite ends 182 and 186 and an end wall 190 connected to the sidewall 178 adjacent end 182. The cylindrical sidewall 178 has a generally cylindrical inner surface 194 that is tapered and have a relatively small taper angle of less than about 10 degrees (FIG. 5) to form a frustoconical shape and thereby form a sealing means between the bobbin 14 and the housing 18. As shown in FIG. 5, the sealing means is a wedge fit seal or taper lock between the tapered outer surface 70 of the exterior surface 60 of the bobbin 14 and the tapered inner surface 194, which is generally complementary to the exterior surface 60. In other words, in the illustrated embodiment the surface portions are held in place by frictional engagement only. The housing 18 includes an annular rim 198 adjacent the end 186 of the sidewall 178. The rim 198 abuts against the annular shoulder 66 on the bobbin 14 and provides a positive stop for positioning the bobbin 14 within the housing 18.

Referring still to FIG. 9, the end wall 190 of the housing 18 includes an inner surface 202. The inner surface 202 has a recessed surface 206 and the probe end surface 162 engages the recessed surface 206 to position the probe near the rotating element (not shown).

The housing 18 is dimensioned and arranged so that the end portion 58 of the bobbin 14 supporting the coil 94 is completely suspended within the housing 18 such that the end portion 58 of the bobbin 14 is spaced from the inner surface 202 of the housing 18. Engagement of the end portion 58 with the inner surface 202 of the housing 18 could stress the coil 94 and cause damage thereto during thermal cycling of the sensor 10.

The housing 18 also includes an outer surface 214 and a plurality of radially outwardly extending annular ribs 218 on the outer surface 214 of the housing 18 and adjacent the rim 198 of the housing 18. The ribs 218 at least partially melt during the overmolding process and combine with the overmolded material to form a secure seal around the bobbin 14 and with the housing 18 to prevent the introduction into the sensor 10 of corrosive elements.

The rotating element (not shown) typically includes a plurality of teeth mounted thereon so that as the rotating element moves past the end wall 190 of the housing 18, the air gap between the rotating element and the sensor 10 varies. This variation results in a variation in the electrical signal generated on the coil 94 of the sensor 10.

FIG. 5 illustrates another embodiment of the invention. Like parts are identified using like reference numerals. The probe end surface 162 has a periphery 166 and a centrally positioned raised portion 170 surrounded by the periphery 166. The raised portion 170 is centered on the axis 34 (which is shown only in FIG. 4). Additionally, the inner surface 202 has an engaging surface 210 surrounding the recessed surface 206. The periphery 166 of the probe end surface 162 engages the engaging surface 210 of the housing 18 so that the raised portion 170 of the probe 130 extends into the recess formed by the recessed surface 206 in the end wall 190 of the housing 18. The probe 130 is supported by the stronger portion (engaging surface 210) of the end wall 190 of the housing 18 while at least a portion of the probe 130 is positioned as close as possible to the rotating member (i.e., in the recess defined by the recessed surface 206). Thus, the structural integrity or ability of the end wall 190 to support the probe 130 and to withstand exposure to vibration, thermal cycling, physical impact and corrosive elements without significant damage to the end wall 190 is enhanced.

Various features of the invention are set forth in the following claims.

We claim:

1. A sensor for detecting the angular velocity of a rotating member, said sensor comprising:
   a bobbin having an end portion defining an annular recess, said bobbin having a tapered outer surface portion;
   a coil mounted on said bobbin and within said recess; and
   a housing constructed and arranged to receive said end portion of said bobbin to enclose said coil within said housing, said housing having a tapered inner surface portion in sealing engagement with said tapered outer surface portion to form a non-threaded wedge fit seal.

2. A sensor as set forth in claim 1, said sensor further including at least one electrically conductive terminal mounted on said bobbin, a lead connected to said electrically conductive terminal and to said coil and having a portion of said lead extending between said recess and said terminal, and supporting means on said bobbin for supporting and positioning adjacent to said bobbin said portion of said lead extending between said recess and said terminal.

3. A sensor as set forth in claim 1 wherein said bobbin includes a shoulder portion spaced from said end portion and said sensor further includes a housing for receiving said end portion of said bobbin to enclose said coil within said housing, said housing having an end wall including an inner surface and an annular rim engaging said shoulder portion of said bobbin so that said end portion of said bobbin is completely suspended within said housing and said end portion of said bobbin is spaced from said inner surface of said housing.

4. A sensor as set forth in claim 3, wherein said shoulder portion of said bobbin extends from said tapered outer surface portion.

5. The sensor as set forth in claim 1, wherein said tapered surface portions are tapered in only one direction.

6. The sensor as set forth in claim 1, wherein said tapered surface portions are frustoconical in shape.

7. The sensor as set forth in claim 1, wherein said tapered surface portions are held in place by frictional engagement only.

8. The sensor as set forth in claim 1, wherein said tapered surface portions are substantially rigid.

9. The sensor as set forth in claim 1, wherein said outer surface portion is integral to said bobbin.

10. The sensor as set forth in claim 1, wherein said tapered surface portions have a taper angle, and wherein said taper angle is less than about 10 degrees.

11. A method of manufacturing a sensor for detecting the angular velocity of a rotating member, said method comprising the steps of:

providing a bobbin having an end portion, having a coil mounted on the bobbin at the end portion, and having a tapered outer surface that narrows toward the end portion;

providing a housing constructed and arranged to receive the end portion of the bobbin to enclose the coil within the housing, the housing having a tapered inner surface arranged to frictionally engage the tapered outer surface of the bobbin; and sealing the bobbin within the housing by pressing the bobbin into the housing to form a taper lock between the tapered outer surface of the bobbin and the tapered inner surface of the housing.

12. The method of claim 11, wherein the tapered outer surface of the bobbin and the tapered inner surface of the housing are substantially rigid.

13. The method of claim 11, wherein the tapered surface portions are tapered in only one direction.

14. The method of claim 11, wherein the tapered surface portions are frustoconical in shape.

15. The method of claim 11, wherein the tapered surface portions are held in place by frictional engagement only.

16. The method of claim 11, wherein the outer surface portion is integral to the bobbin.

17. The method of claim 11, wherein the tapered surface portions have a taper angle, and wherein the taper angle is less than about 10 degrees.

* * * * *